United States Patent
Nagamine et al.

(10) Patent No.: US 7,392,795 B2
(45) Date of Patent: Jul. 1, 2008

(54) INTERNAL COMBUSTION ENGINE AND COMBUSTION CONTROL METHOD

(75) Inventors: Morihiro Nagamine, Yokosuka (JP); Akihiko Kakuho, Yokohama (JP); Taisuke Shiraishi, Yokohama (JP); Eiji Takahashi, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/749,323

(22) Filed: May 16, 2007

(65) Prior Publication Data

US 2007/0266979 A1    Nov. 22, 2007

(30) Foreign Application Priority Data

May 17, 2006    (JP)    ............... 2006-137483

(51) Int. Cl.
*F02P 19/00*    (2006.01)
*F02B 11/00*    (2006.01)
*F02M 27/00*    (2006.01)

(52) U.S. Cl. ............. 123/536; 123/48 R; 123/78 R; 123/90.15; 123/143 B; 123/430

(58) Field of Classification Search ............... 123/48 R, 123/78 R, 90.15, 429, 430, 536–538, 143 B
See application file for complete search history.

(56) References Cited

U.S. PATENT DOCUMENTS 5,823,152 A    10/1998    Ushida
6,474,321 B1 *    11/2002    Suckewer et al. ........ 123/143 B
6,491,003 B2    12/2002    Moteki
6,497,213 B2    12/2002    Yoshizawa et al.
6,745,744 B2 *    6/2004    Suckewer et al. ........... 123/297
6,986,342 B2 *    1/2006    Thomas ...................... 123/536

FOREIGN PATENT DOCUMENTS

| JP | H04-17706 | 1/1992 |
|----|-----------|--------|
| JP | H07-71279 | 3/1995 |
| JP | H09-60508 | 3/1997 |
| JP | H11-101127 | 4/1999 |
| JP | 2000-213314 | 8/2000 |
| JP | 2001-020842 | 1/2001 |
| JP | 2001-323828 | 11/2001 |
| JP | 2001-323829 | 11/2001 |
| JP | 2002-115571 | 4/2002 |

* cited by examiner

*Primary Examiner*—T. M Argenbright
(74) *Attorney, Agent, or Firm*—Global IP Counselors, LLP

(57) ABSTRACT

An internal combustion engine is provided that basically comprises a combustion chamber, an electric discharge unit and a controller. The combustion chamber receives a mixture of fuel and air that is caused to undergo compression self ignition. The electric discharge unit is provided inside the combustion chamber to generate an electric discharge for conducting combustion inside the combustion chamber. The controller is configured to control a voltage applied to the electric discharge unit. The controller is configured to control the electric discharge unit such that a non-thermal plasma can be formed without incurring a transition to arc discharging, and to control the quantity and distribution of an activated air-fuel mixture inside the combustion chamber in accordance with an operating condition of the internal combustion engine.

31 Claims, 13 Drawing Sheets

INTERNAL COMBUSTION ENGINE AND COMBUSTION CONTROL METHOD

CROSS-REFERENCE TO RELATED APPLICATIONS

This application claims priority to Japanese Patent Application No. 2006-137483, filed on May 17, 2006. The entire disclosure of Japanese Patent Application No. 2006-137483 is hereby incorporated herein by reference.

BACKGROUND OF THE INVENTION

1. Field of the Invention

The present invention relates to an internal combustion engine configured to ignite a premixed air-fuel mixture introduced into a cylinder by compression self ignition. The present invention also relates to a combustion control device for such an engine.

2. Background Information

Japanese Laid-Open Patent Publication No. 7-71279 discloses an example of an internal combustion engine configured to ignite a premixed air-fuel mixture introduced into a cylinder by compression self ignition. An advantage of igniting a premixed air-fuel mixture by compression self ignition is that combustion reactions start substantially simultaneously in a plurality of places inside the cylinder, thus enabling a shorter combustion time and a more stable combustion performance than spark ignition to be accomplished even when the air-fuel ratio is lean. Thus, NOx emissions can be greatly reduced because the engine can be operated on a lean air-fuel mixture at a low combustion temperature. Meanwhile, a disadvantage of this combustion method is that the usable operating range, i.e., the load region and rotational speed (engine speed) region in which engine operation is possible, is very limited due to the knocking limit and the misfiring limit. More specifically, the flame propagation is different from that obtained with spark ignition in that the substantially simultaneous self ignitions of the fuel in the air-fuel mixture inside the combustion chamber causes the combustion pressure to rise more rapidly than in the case of spark ignition. Consequently, operation of the compression self ignition engine becomes more difficult as the load increases. Thus, it is difficult to employ such an engine in applications requiring a wide operating region, such as in a vehicle.

Japanese Laid-Open Patent Publication No. 2001-323829 (corresponds to U.S. Pat. No. 6,497,213) discloses an internal combustion engine configured to vary the combustion start timing inside a combustion chamber using an ozone generating device provided in an intake port. More specifically, the combustion speed is controlled by changing an angle of the combustion start timing. Japanese Laid-Open Patent Publication No. 2001-020842 discloses another internal combustion engine in which the amount of radicals produced for radical reactions is controlled by setting the discharge start timing of a capacitive discharge or an inductive discharge of a spark plug or by providing two types of spark plugs having different capacitive discharge characteristics. By controlling the radical production amount, the combustion stability is controlled.

SUMMARY OF THE INVENTION

It has been discovered that with the engine disclosed in Japanese Laid-Open Patent Publication No. 2001-323829, since an ozone generating device is provided at the intake port in order to set an angle against combustion start timing, the degree of freedom of the combustion control is low because the control can only be executed during the intake stroke. Furthermore, it is known that radicals, e.g., ozone ($O_3$), hydroxyl radical (OH), and other active oxygens, do no easily exist at low temperatures, and thus, a large portion of the radicals disappear between the time when they are introduced during the intake stroke and the time when the ignition timing is reached. Consequently, the effect of introducing the radicals is diminished. Meanwhile, with the engine disclosed in Japanese Laid-Open Patent Publication No. 2001-020842, since the electric discharge device employs only a normal spark plug and is intended for producing an arc discharge, the number of places where electric discharges are produced is very small and the amount of radicals produced is limited. Additionally, since the amount of radicals produced is controlled solely by controlling the discharge start time, the combustion control method cannot accommodate high engine speeds and other operating conditions requiring a large amount of radicals to be produced in a short amount of time. Furthermore, since ignition assistance is not executed in order to suppress the combustion speed in high load regions, the operable regions of invention disclosed in Japanese Laid-Open Patent Publication No. 2001-020842 cannot be effectively expanded to include high-load operating regions.

In view of the above mentioned technology, the present invention provides an internal combustion engine that basically comprises a combustion chamber, an electric discharge unit and a controller. The combustion chamber receives a mixture of fuel and air that is caused to undergo compression self ignition. The electric discharge unit is provided inside the combustion chamber to generate an electric discharge for conducting combustion inside the combustion chamber. The controller is configured to control a voltage applied to the electric discharge unit. The controller is configured to control the electric discharge unit such that a non-thermal plasma can be formed without incurring a transition to arc discharging, and to control the quantity and distribution of an activated air-fuel mixture inside the combustion chamber in accordance with an operating condition of the internal combustion engine.

Various objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
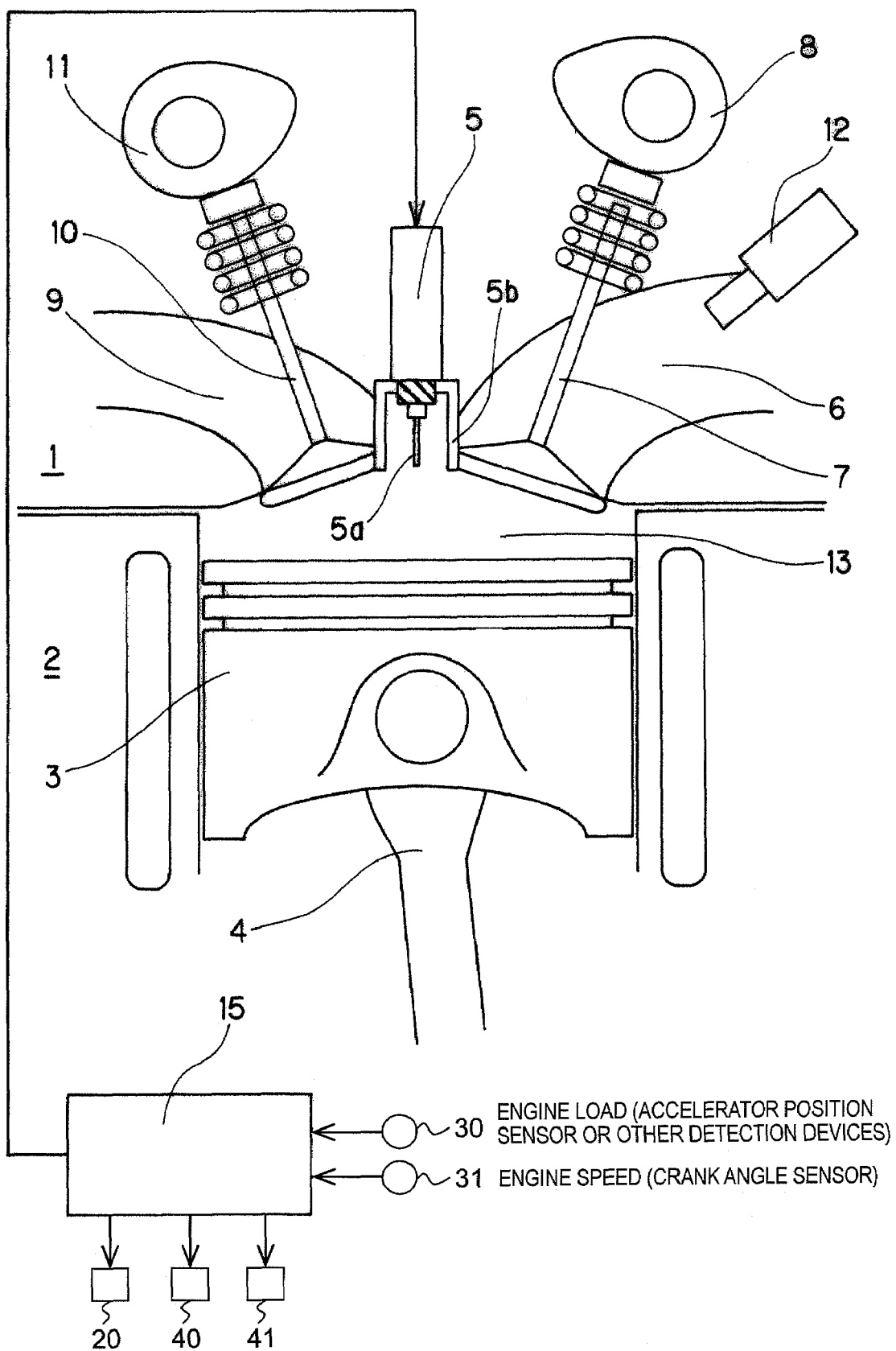
FIG. 1 is a schematic view of an internal combustion engine in accordance with a first embodiment.

Referring initially to FIG. 1, an internal combustion engine is schematically illustrated in accordance with a first embodiment of the present invention. As shown in FIG. 1, the engine is a gasoline engine that includes a cylinder head 1 and a cylinder block 2. While only a single cylinder is illustrated, it will be apparent to those skilled in the art from this disclosure that the engine preferably includes multiple cylinders, with each cylinder including a piston 3, a connecting rod 4, an electric discharge unit 5, an intake port 6, a pair of intake valves 7 (only one shown in FIG. 1), an intake valve drive cam 8, an exhaust port 9, a pair of exhaust valves 10 (only one shown in FIG. 1), an exhaust valve drive cam 11, a fuel injection valve 12, and a combustion chamber 13. This engine preferably has two intake valves 7 and two exhaust valves 10, i.e., a total of four valves, per cylinder. The fuel injection valve 12 is arranged to point toward the intake port 6, thus constituting an MPI fuel injection system. The fuel stream discharged from the fuel injection valve 12 serves to supply a pre-mixed air-fuel mixture to the inside of the cylinder. An intake control valve 20 is provided in the intake port 6 to enable the combustion inside the cylinder to be switched between homogenous combustion and stratified combustion.

The electric discharge unit 5 is mounted to the cylinder head 1 such that it faces toward a middle portion of the combustion chamber 13. The electric discharge unit 5 comprises two electrodes: a needle-like center electrode 5a and a cylindrical electrode 5b that surrounds the center electrode 5a. The controller 15 is configured to apply a voltage to the electric discharge unit 5 so as to produce a non-thermal plasma without incurring a transition to arc discharging. There are various types of electric discharge devices capable of executing this kind of electric discharge. For example, a device that prevents a transition to arc discharging by controlling the voltage with extremely short pulses or a device (barrier discharge device) that has a dielectric material arranged between the electrodes can be used. Thus, any electric discharge devices capable of carrying out the present invention can be used.

With the present invention, as explained below, the operable region (usable operating region) of an internal combustion engine using homogeneous charge compression ignition is expanded. In particular, the present invention employs that electric discharge unit 5 that is configured to be controlled such that a localized arc discharge does not occur. Instead, the combustion of the internal combustion engine is controlled by employing the controller 15 to produce a non-thermal plasma in, for example, a homogeneous air-fuel mixture without incurring a transition to arc discharging. The non-thermal plasma serves to increase the degree of activity of the air-fuel mixture and to control the distribution of the activated air-fuel mixture in accordance with the operating load or other operating condition. Thus, a distribution of the air-fuel mixture is created that has been activated by raising only the electron temperature. As a result, the desired combustion control can be accomplished over a wider operating region without increasing the amount of HC and NOx emissions produced. Since the electric discharge unit 5 is provided directly inside the combustion chamber instead of an air induction passage, the degree of freedom of the control is higher and an air-fuel mixture that is active with respect to combustion, i.e., radicals, can be produced even when the temperature inside the combustion chamber is high. As a result, the self ignition combustion can be controlled in a manner that is highly efficient from the standpoint of the amount of energy imparted. Also since the electric discharge unit 5 is not intended solely for arc discharging, the discharge volume is markedly larger than the discharge volume obtained with a conventional spark plug. Furthermore, since the discharge voltage can be controlled, a discharge with a high voltage and a short duration can be used to produce an activated air-fuel mixture when the rotational speed of the engine is high. Thus, the timing with which the air-fuel mixture is activated can also be adjusted with a large degree of freedom.

Preferably, the controller 15 is configured to detect the engine load and/or the rotational speed of the engine as representative of an engine operating condition. The engine operating condition can be detected, for example, by using an accelerator pedal position sensor 30 as an engine load detector and/or a crank angle sensor 31 as an engine rotational speed detector. Based on the detected values, the controller 15 controls the voltage applied to the electric discharge unit 5 and amount of time over which the voltage is applied (voltage application time). In this way, the controller 15 controls the distribution of the activated air-fuel mixture and starts combustion due to compression heating during the compression stroke of the engine, thus accomplishing compression self ignition (i.e., homogeneous charge compression ignition or "HCCI").

The controller 15 preferably includes a microcomputer with an ignition control program that controls the fuel injection valve 12 and the intake control valve 20. The controller 15 also preferably include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller 15 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
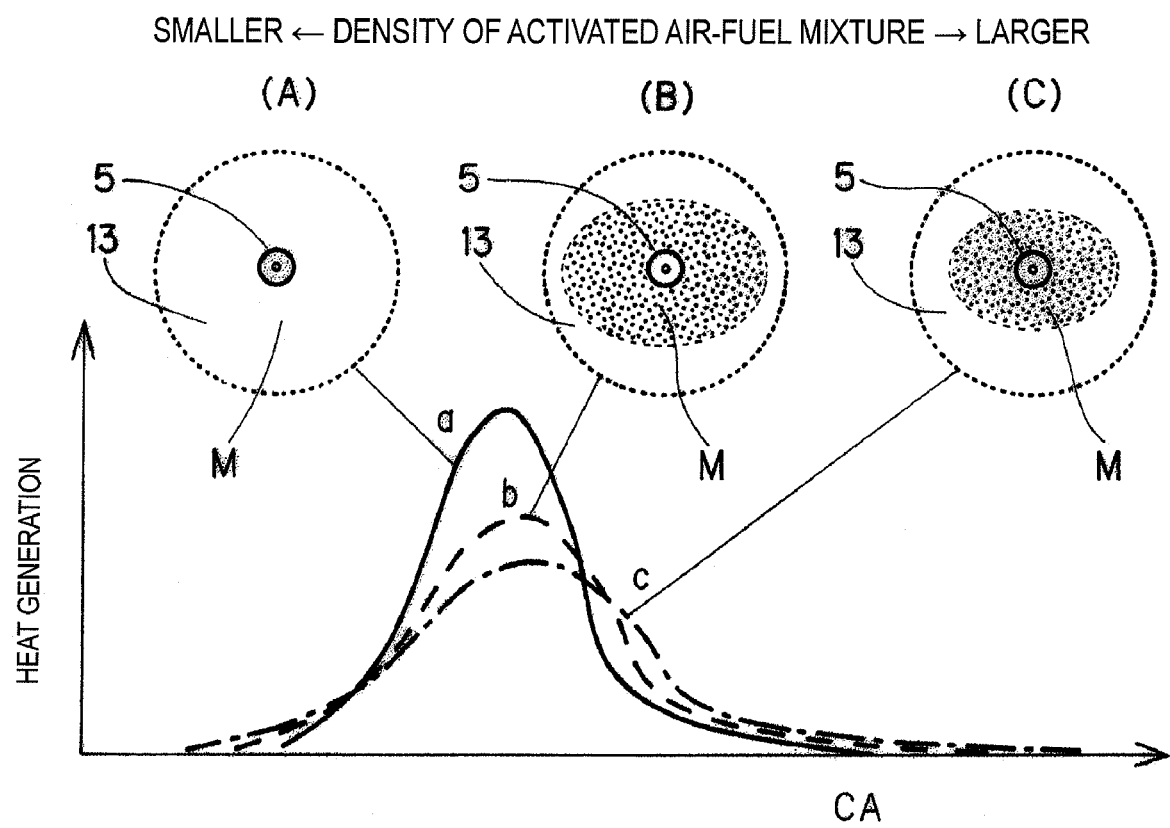
FIG. 2 illustrates how the controlling the distribution of the activated air-fuel mixture affects the generation of heat.
Figure 3:
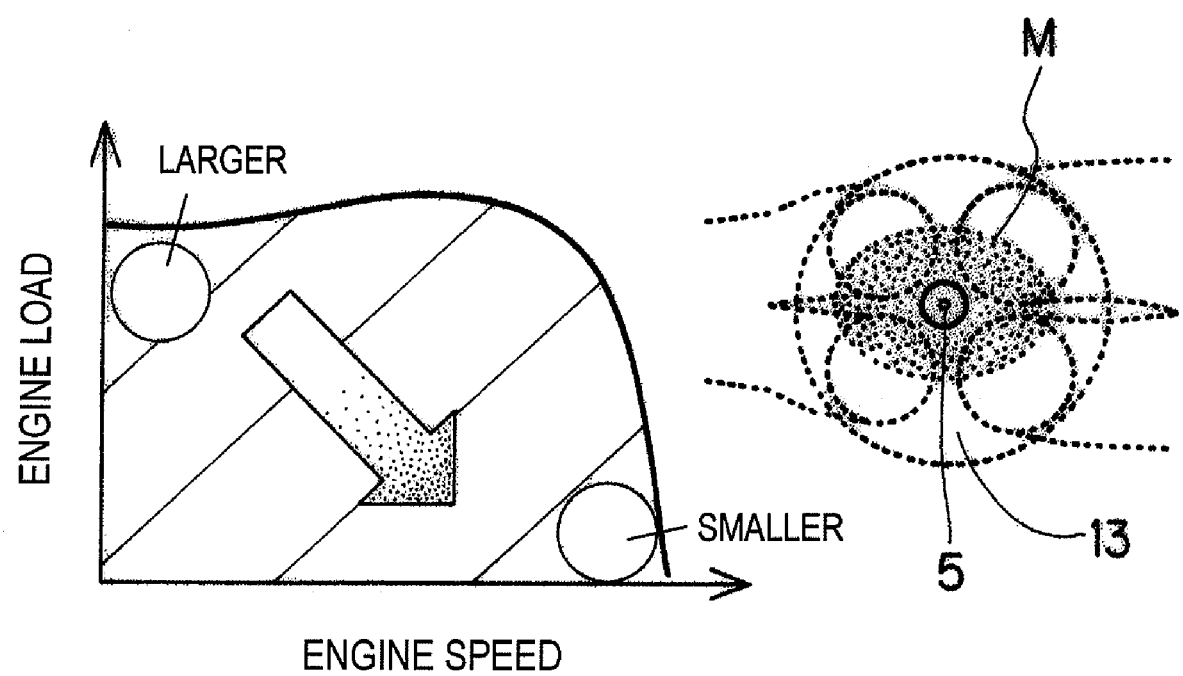
FIG. 3 is a plot illustrating the degree of stratification of the activated air-fuel mixture distribution in relation to the engine load and the engine speed.

The control of the compression self ignition will now be discussed in more detail. FIG. 2 illustrates how the controlling the distribution of the activated air-fuel mixture affects the generation of heat. Images A to C in FIG. 2 illustrate the fuel distribution around the electric discharge unit 5 inside the cylinder. In FIG. 2, the air-fuel mixture charge is indicated with the reference letter "M" and the crank angle is indicated with the reference letters "CA" (the same applies to subsequent figures discussed later). As shown in image (A) of FIG. 2, when the activated air-fuel mixture has a low density and is distributed homogeneously in the cylinder, the overall combustion speed is higher and the combustion period (amount of time during which combustion occurs) is shorter, as indicated by the curve a (solid line). In contrast, as the distribution of the activated air-fuel mixture becomes more stratified and the density of the air-fuel mixture charge M increases, the combustion start timing becomes more advanced and the combustion period increases, resulting in a more sluggish combustion. Curve b (broken line) and curve c (single-dot chain line) illustrate this phenomenon. In view of this phenomenon, the present invention seeks to expand the usable operating region of the internal combustion engine by controlling the distribution and amount of the air-fuel mixture such that, as shown in FIG. 3 (for example), the degree of stratification increases as the engine speed decreases and the engine load increases and the degree of stratification decreases engine speed increases and the engine load decreases.

Since the quantity and distribution of the activated air-fuel mixture are controlled by controlling the applied voltage and voltage application time of the controller 15, there is no need for a separate mechanical device of accomplishing this control. Additionally, in terms of the imparted energy, precise combustion control can be accomplished in accordance with the operating conditions.

Figure 4:
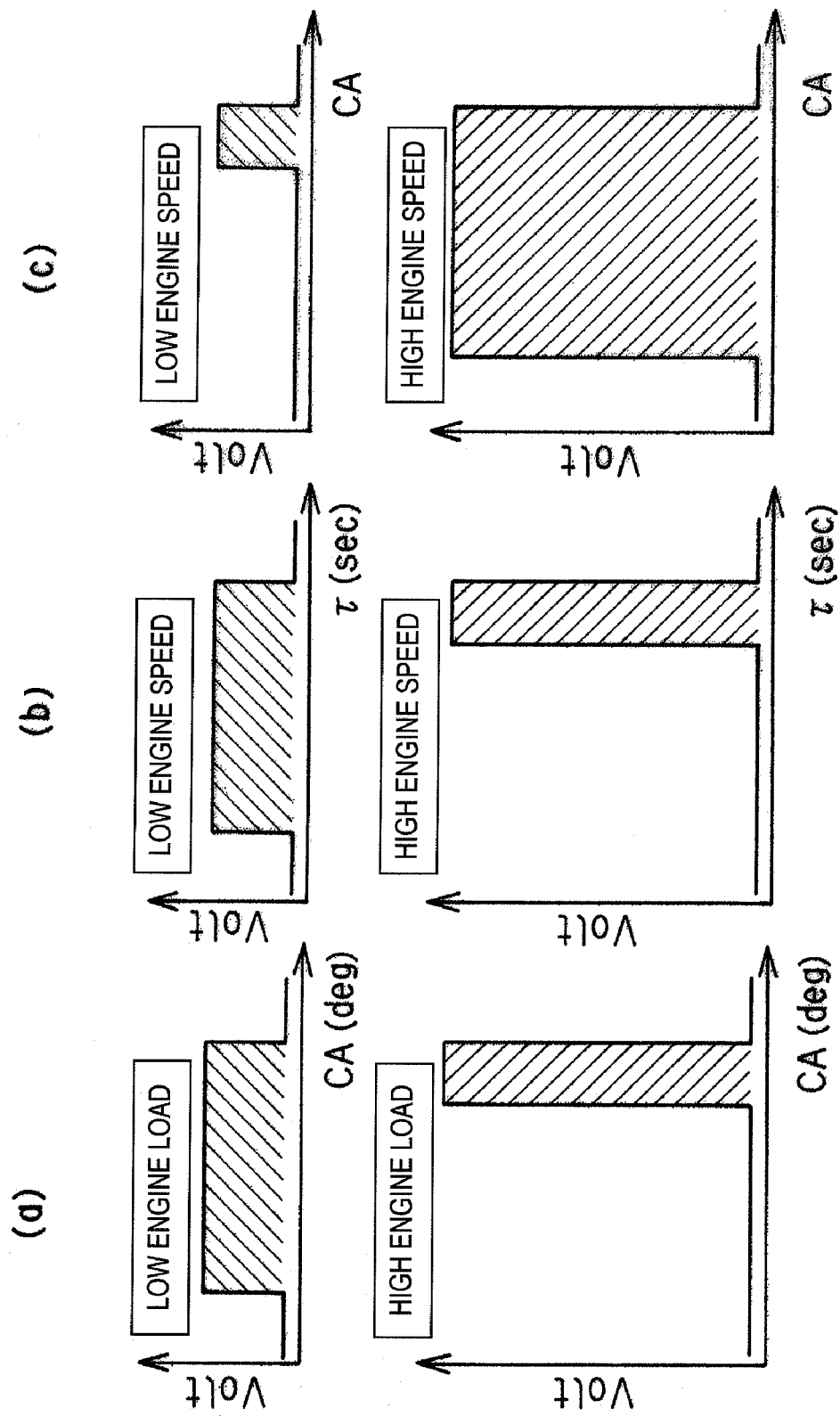
FIG. 4 illustrates the relationship between the applied voltage and the voltage application time (period) when the control is configured keep the imparted energy constant.
Figure 5:
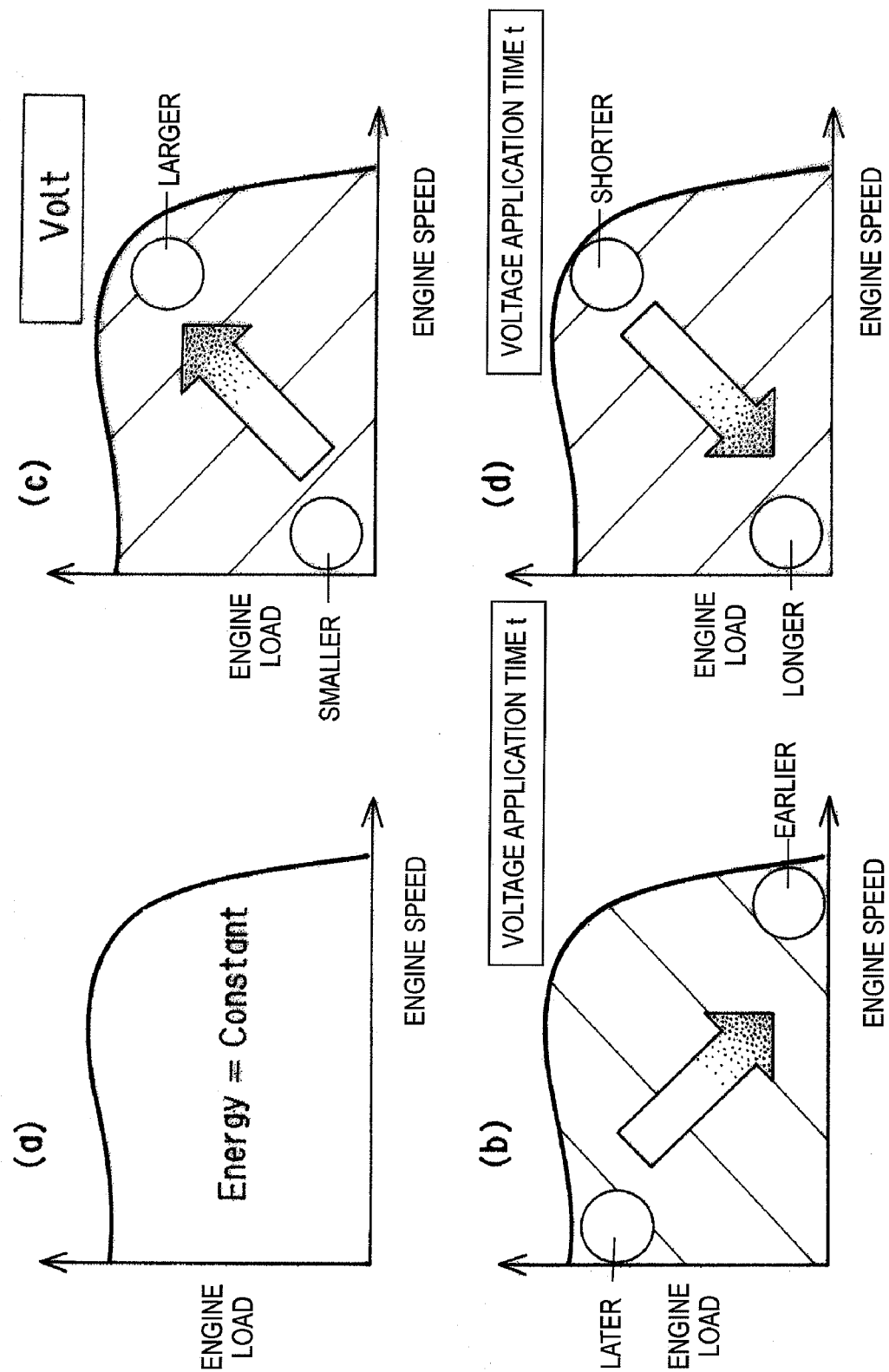
FIG. 5 illustrates a series of plots illustrating the applied voltage, the voltage application timing, and the voltage application time (period), respectively, in relation to the engine load and the engine speed when the control is configured to keep the imparted energy constant.

FIGS. 4 and 5 illustrate an example of a control method in which the energy imparted to the controller 15 or the electric discharge unit 5 is kept substantially constant regardless of the operating conditions. In other words, the applied voltage and the voltage application time are controlled such that the product of the applied voltage and the voltage application time remains constant. As shown in part (a) of FIG. 5, by controlling the electric discharge such that the imparted energy remains substantially constant across the entire operating region, the combustion can be controlled without degrading the efficiency of the engine system as a whole and a high overall operating efficiency can be achieved.

Part (a) of FIG. 4 illustrates a case in which the engine load is detected as an operating condition and imparted energy amount of the controller 15 is held constant by setting the voltage application time (expressed in terms of crank angle CA in this example) longer and the applied voltage smaller when the engine load is in a low load region than in cases when the engine load is in a high load region, and setting the voltage application time shorter and the applied voltage higher when the engine load is in a high load region than in cases when the engine load is in a low load region. Also, the voltage application start timing is earlier when the engine load is in a low load region than in cases when the engine load is in a high load region. This is because, regardless of whether the engine load is in a low load region or high, the ignition timing is set to occur near the top dead center position of the piston 3 and the voltage application start timing is adjusted based on the how long or short the voltage application time (period) is.

For convenience, the figure shows how the relationship between the applied voltage and the voltage application time changes in accordance with the operating conditions. The area enclosed inside the characteristic curve is equivalent to the amount of imparted energy, but it does not necessarily represent the imparted energy amount in this embodiment (the same applies to FIG. 6 discussed later).

Since the rate at which the combustion pressure rises is smaller when the engine load is in a low load region than in cases when the engine load is in a high load region, the control is contrived such that when the engine load is in a low load region, the voltage application time is set longer and the applied voltage is set lower, thereby producing an activated air-fuel mixture at a stage occurring earlier than the ignition timing and distributing the air-fuel mixture homogeneously inside the combustion chamber. Thus, the ignition start timing angle inside the combustion chamber is lowered and the combustion speed is increased in the combustion chamber as a whole, thereby enabling the operating region to be expanded to include lower loads.

Meanwhile, since the rate at which the combustion pressure rises is larger when the engine load is in a high load region than in cases when the engine load is in a low load region, the control is contrived such that when the engine load is in a high load region, the voltage application time is set shorter and the applied voltage is set higher, thereby producing an activated air-fuel mixture at a stage occurring immediately before the ignition timing and stratifying the air-fuel mixture. Thus, the combustion is more sluggish because the ignition start timing angle is increased and a phase difference is provided in the ignition timing inside the combustion chamber. As a result, knocking can be prevented and the operating region can be expanded to include higher loads.

Part (b) of FIG. 4 illustrates a case in which the engine speed is detected as an operating condition and the amount of imparted energy of the controller 15 is held constant by setting the voltage application time (expressed in terms of actual time τ in this example) longer and the applied voltage smaller when the engine speed is in a low speed range (for example under 1000 rpm) than in cases when the engine speed is in a high speed range (for example over 2000 rpm) and setting the voltage application time shorter and the applied voltage higher when the engine speed is in a high speed range than in cases when the engine speed is in a low speed range.

It is also possible to execute the control by defining the voltage application timing in terms of the crank angle CA instead of using an actual voltage application time τ. In such a case, as shown in part (c) of FIG. 4, the crank angle CA and applied voltage are set to be smaller when the engine speed is in a low speed range than in cases when the engine speed is in a high speed range and the crank angle CA and applied voltage are set to be larger when the engine speed is in a high speed range than in cases when the engine speed is in a low speed range.

Since the actual amount of time of the compression stroke is longer when the engine speed is in a low speed range, the control is contrived such that the voltage application time is longer and the applied voltage is smaller when the engine speed is in a low speed range than in cases when the engine speed is in a high speed range. Thus, the amount of time during which the activated air-fuel mixture is produced is longer when the engine speed is in a low speed range. Meanwhile, since the actual amount of time is shorter when the engine speed is in a high speed range, the control is contrived such that the voltage application time is shorter and the applied voltage is larger when the engine speed is in a high speed range than in cases when the engine speed is in a low speed range.

Thus, the combustion can be controlled in such a manner that the ignition start timing is controlled reliably without increasing the imparted energy. It is also acceptable to combine the controls shown in parts (a) and (b) of FIG. 4. More specifically, it is acceptable to detect both the engine load and the engine speed as operating conditions and configure the control such that the voltage application time is set longer and the applied voltage is set smaller when the engine load and engine speed are low than in cases when the engine load and engine speed are high and the voltage application time is set shorter and the applied voltage is set larger when the engine load and engine speed are high than in cases when the engine load and engine speed are low (see parts (c) and (d) of FIG. 5).

In this way, the operable region can be expanded with respect to both the engine speed and the engine load.

In each of the control configurations described above, the timing (crank angle) at which the voltage is applied by the controller 15 is earlier (more advanced) when the engine speed is in a high speed range and the engine load is in a low load region than in cases when the engine speed is in a low speed range and the engine load is in a high load region and later (more retarded) when the engine speed is in a low speed range and the engine load is in a high load region than in cases when the engine speed is in a high speed range and the engine load is in a low load region (see part (b) of FIG. 5). As a result, the operable region can be expanded even further.

The control methods illustrated in FIGS. 4 and 5 are representative examples of combustion control methods in which the energy imparted to the controller 15 is held substantially constant. However, the invention is not limited to these methods. For example, it is also acceptable to vary the energy imparted to the controller 15 in accordance with changes in an operating condition, as illustrated in FIGS. 6 and 7.

Figure 6:
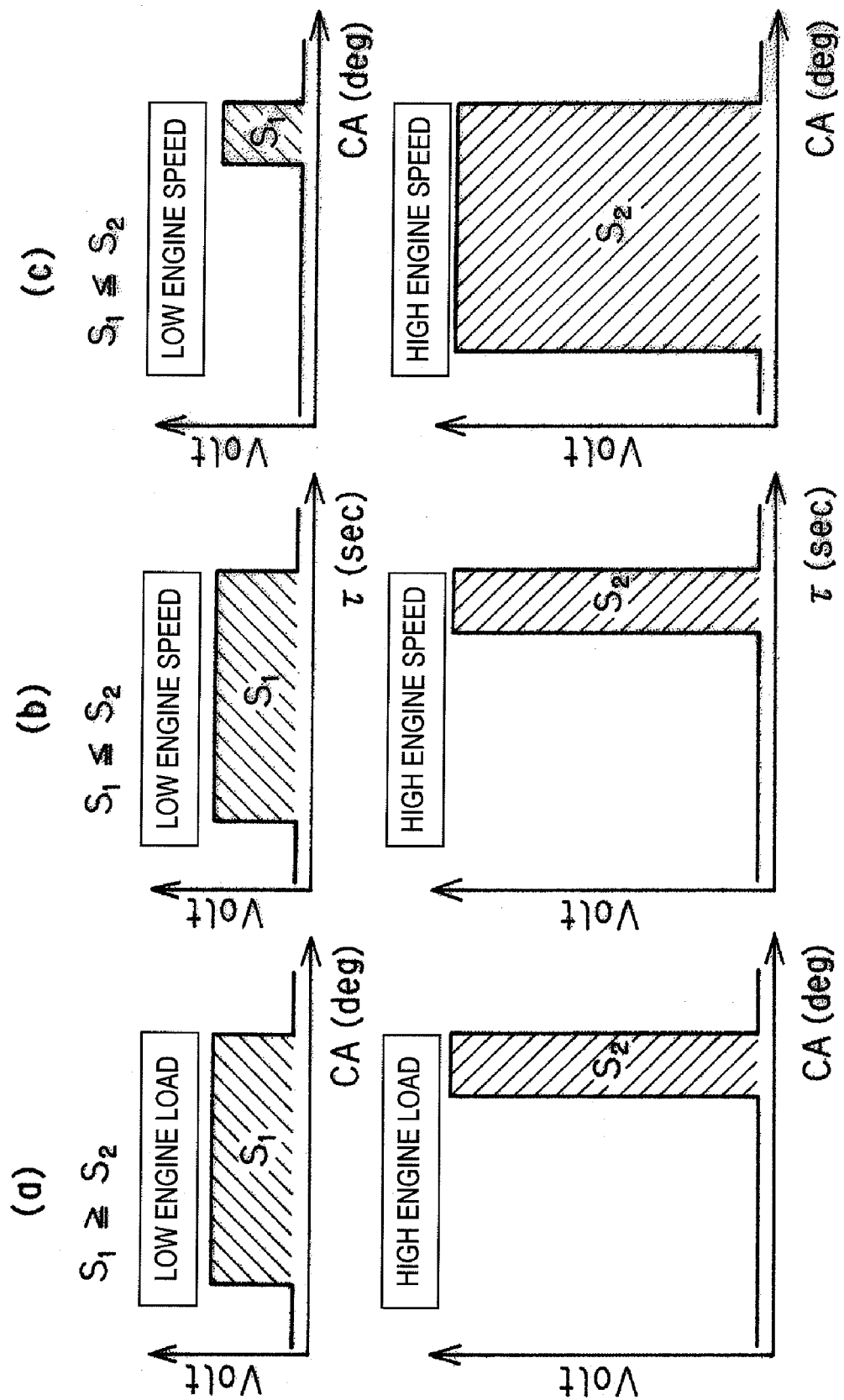
FIG. 6 illustrates the relationship between the applied voltage and the voltage application time (period)
Figure 7:
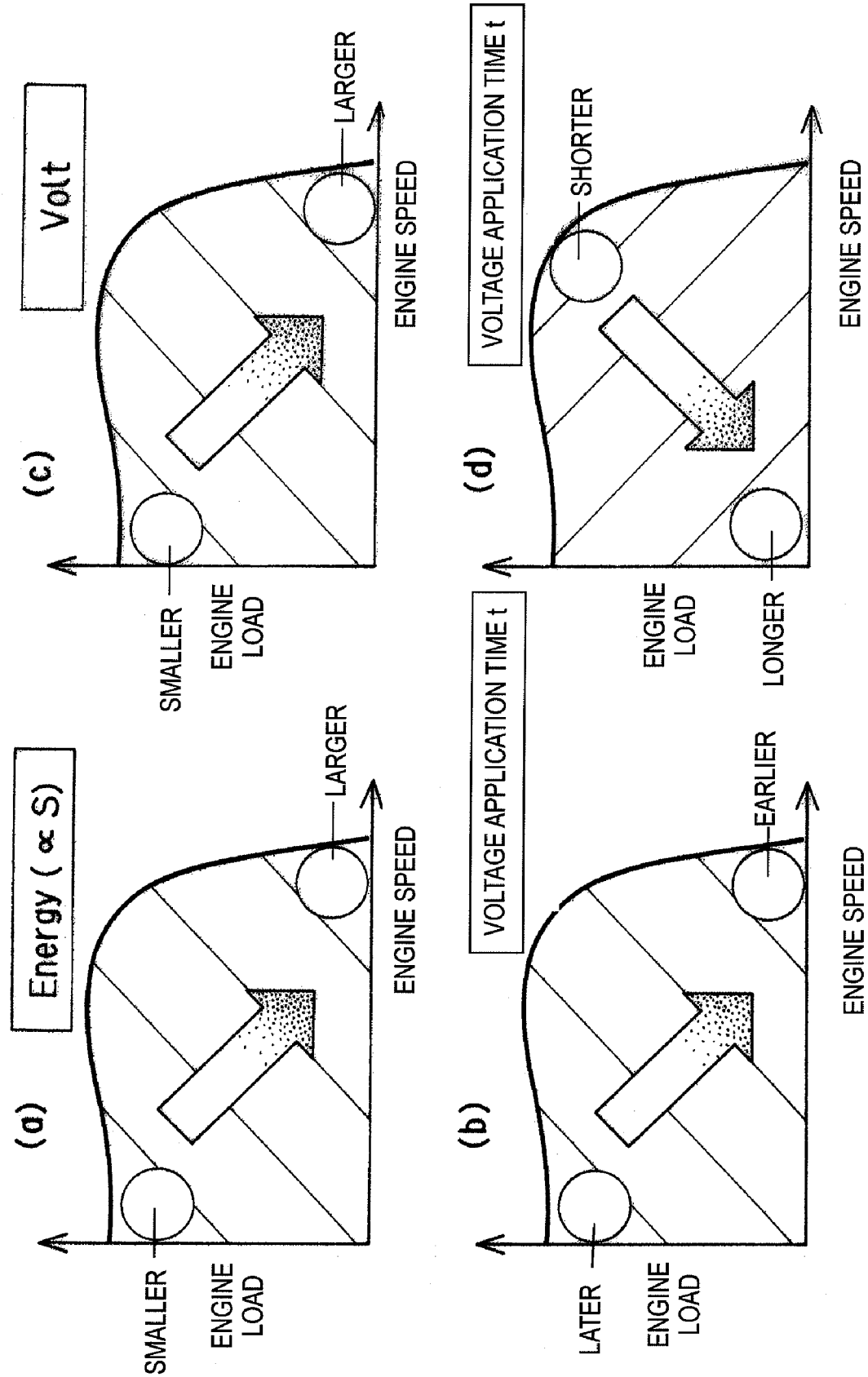
FIG. 7 illustrates a series of plots illustrating the applied voltage, the voltage application timing, and the voltage application time, respectively, in relation to the engine load and the engine speed.

In part (a) of FIG. 6, the engine load is detected as the operating condition and the energy $S_1$ imparted to the controller 15 when the engine load is in a low load region is set to be larger than the energy $S_2$ imparted to the controller 15 when the engine load is in a high load region.

By executing control such that the energy imparted to the controller 15 is larger when the engine load is in a low load region than in cases when the engine load is in a high load region, the combustion speed can be increased further and the lean limit can be expanded, thereby achieving a higher efficiency. Meanwhile, by executing control such that the energy imparted to the controller 15 is smaller when the engine load is in a high load region than in cases when the engine load is in a low load region, the impartation of an excessive amount of energy to the controller 15 can be avoided and the efficiency of the engine system as a whole can be increased.

In part (b) of FIG. 6, the engine speed is detected as the operating condition and the energy part (a) of FIG. 4 imparted to the controller 15 when the engine speed is in a low speed range is set to be larger than the energy $S_2$ imparted to the controller 15 when the engine speed is in a high speed range.

Since the actual amount of time of the compression stroke is longer when the engine speed is in a low speed range, a longer combustion period is readily available and the activated air-fuel mixture can be produced reliably even if the amount of energy imparted to the controller 15 is reduced in comparison with the amount of energy imparted when the engine speed is in a high speed range. Consequently, the efficiency of the engine system as a whole can be increased. Meanwhile, since the actual amount of time is shorter when the engine speed is in a high speed range, the amount of imparted energy is increased in comparison with when the engine speed is in a low speed range so as to increase the amount of activated air-fuel mixture. As a result, the combustion speed is increased and the operable region can be expanded to include higher rotational speeds.

It is also acceptable to combine the controls shown in parts (a) and (b) of FIG. 6. More specifically, it is acceptable to detect both the engine load and the engine speed as operating conditions and contrive the control such that the energy imparted to the controller 15 is larger when the engine load is in a low load region and the engine speed is in a high speed range than in cases when the engine load is in a high load region and the engine speed is in a low speed range and the energy imparted to the controller 15 is smaller when the engine load is in a high load region and the engine speed is in a low speed range than in cases when the engine load is in a low load region and the engine speed is in a high speed range (see part (a), (c) and (d) of FIG. 7). As a result, the operable region can be expanded with respect to both the engine speed and the engine load and the efficiency of the engine system as a whole can be increased.

In each of the control configurations described above, the timing (crank angle) at which the voltage is applied by the controller 15 is earlier (more advanced) when the engine speed is in a high speed range and the engine load is in a low load region than in cases when the engine speed is in a low speed range and the engine load is in a high load region and later (more retarded) when the engine speed is in a low speed range and the engine load is in a high load region than in cases when the engine speed is in a high speed range and the engine load is in a low load region (see FIG. 7(b)). As a result, the operable region can be expanded even further.

Similarly to the embodiments shown in FIGS. 4 and 5, the imparted energy of the controller 15 can be adjusted by changing the voltage applied to the electric discharge unit 5 and the voltage application time.

For example, when the control is configured to detect the engine load as the operating condition, the voltage application time is set longer when the engine load is in a low load region and shorter when the engine load is in a high load region (see part (d) of FIG. 7). Since the rate at which the combustion pressure rises is smaller when the engine load is in a low load region than in cases when the engine load is in a high load region, the control is contrived such that when the engine load is in a low load region, the voltage application time is set longer than in cases when the engine load is in a high load region, thereby producing an activated air-fuel mixture at a stage occurring earlier than the ignition timing and distributing the air-fuel mixture homogeneously inside the combustion chamber.

As a result, the ignition start timing angle inside the combustion chamber is lowered and the combustion speed is increased in the combustion chamber as a whole, thereby enabling the operating region to be enlarged to include lower loads.

Meanwhile, since the rate at which the combustion pressure rises is larger when the engine load is in a high load region than in cases when the engine load is in a low load region, the control is contrived such that when the engine load is in a high load region, the voltage application time is set shorter than in cases when the engine load is in a low load region, thereby producing an activated air-fuel mixture at a stage occurring immediately before the ignition timing and stratifying the air-fuel mixture. Thus, the combustion is more sluggish because the angle of the ignition start timing is increased such that a phase difference is provided in the ignition timing inside the combustion chamber. As a result, knocking can be prevented and the operating region can be expanded to include higher loads.

Another method of controlling the imparted energy when the engine load is detected as the operating condition is to set the applied voltage larger when the engine load is in a low load region than in cases when the engine load is in a high load region and set the applied voltage smaller when the engine load is in a high load region than in cases when the engine load is in a low load region (see part (c) of FIG. 7). When the engine load is in a low load region, the applied voltage is set larger than in cases when the engine load is in a high load region so as to increase the energy imparted to the electric discharge device. As a result, the combustion speed is increased further and the lean limit can be expanded. Meanwhile, when the engine load is in a high load region, the applied voltage is set lower than in cases when the engine load is in a low load region so as to decrease the energy imparted to the electric discharge device and enable the efficiency of the engine system as a whole to be increased.

When the control is configured to detect the engine speed as the operating condition, the voltage application time is set longer when the engine speed is in a low speed range and shorter when the engine speed is in a high speed range (see part (d) of FIG. 7). Since the actual amount of time is longer when the engine speed is in a low speed range, the voltage application time is set longer when the engine speed is in a low speed range than in cases when the engine speed is in a high speed range so as to lengthen the amount of time during which the activated air-fuel mixture is produced. Since the actual amount of time is shorter when the engine speed is in a high speed range, the voltage application time is set shorter when the engine speed is in a high speed range than in cases when the engine speed is in a low speed range. Thus, the ignition start timing can be controlled reliably and the combustion can be controlled accurately.

Another method of controlling the imparted energy when the engine speed is detected as the operating condition is to set the applied voltage smaller and the voltage application time τ longer when the engine speed is in a low speed range than in cases when the engine speed is in a high speed range and set the applied voltage larger and the voltage application time shorter when the engine speed is in a high speed range than in cases when the engine speed is in a low speed range (see parts (c) and (d) of FIG. 7).

Since the actual amount of time is longer when the engine speed is in a low speed range, a longer combustion period can be secured. Consequently, when the engine speed is in a low speed range, the efficiency of the engine system as a whole can be increased by making the applied voltage smaller than in cases when the engine speed is in a high speed range and, thereby, reducing the amount of energy imparted to the electric discharge device. Meanwhile, since the actual amount of time is shorter when the engine speed is in a high speed range, the control is contrived such that the voltage application time is shorter and the applied voltage is larger than in cases when the engine speed is in a low speed range, thus increasing the imparted energy. As a result, the amount of activated air-fuel mixture is increased such that the combustion speed is increased and the operable region is expanded to include high rotational speeds. When both the engine load and the engine speed are detected as operating conditions, the control methods can be combined. For example, the voltage application time can be set longer when the engine load and engine speed are low and shorter when the engine load and engine speed are high, or the applied voltage can be set larger when the engine load is in a low load region and the engine speed is in a high speed range and smaller when the engine load is in a high load region and the engine speed is in a low speed range.

In this way, an ignition start timing angle can be established at a timing tailored to the operating conditions and the combustion can be controlled such that the operable region is expanded with respect to both the engine speed and the engine load.

Figure 8:
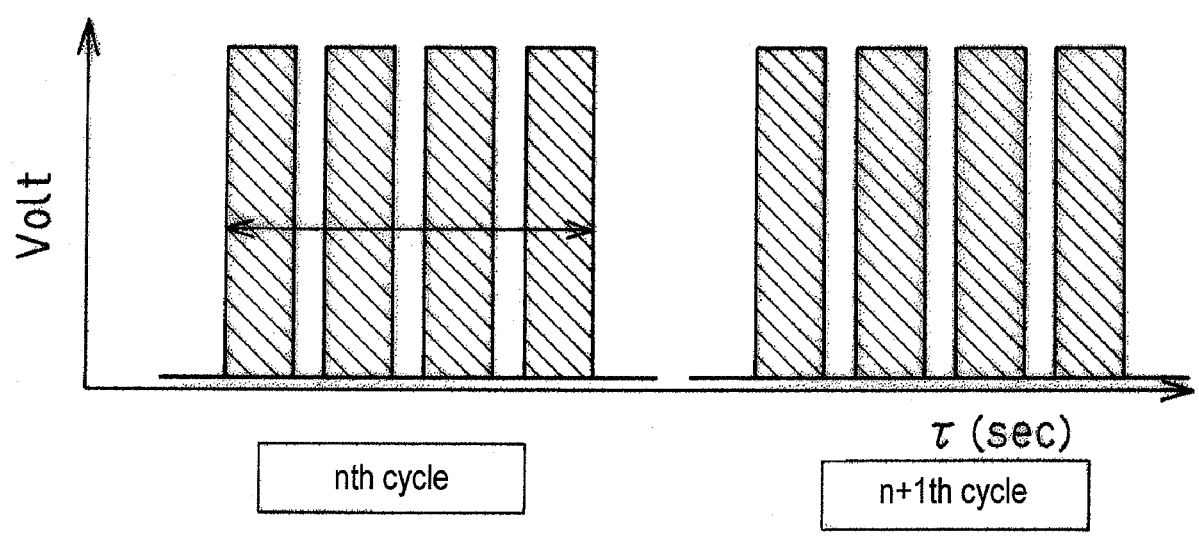
FIG. 8 illustrates an example of how the voltage application time τ is controlled.

FIG. 8 illustrates the control of the voltage application time τ in any of the aforementioned control methods. The voltage application time τ is set in such a fashion as to avoid a transition to arc discharging. If conditions are such that a further increase in the applied voltage would cause a transition to arc discharging, the voltage application is divided into a plurality of shorter applications executed during a single cycle, as shown in the figure. When a plurality of voltage applications are executed, the voltage application time for the voltage applied to the electric discharge unit 5 in the previously described control methods is equal to the sum of the application times of the individual voltage applications executed during one cycle.

In the previously described control methods, the timing of the voltage application, the voltage application time, and the magnitude of the applied voltage are controlled in order to control the distribution of the activated air-fuel mixture. However, it is also acceptable to include a control of the gas flow inside the cylinder. More specifically, the intake control valve 20 can be used as a combustion state selecting device or mechanism. More specifically, the intake control valve 20 can be controlled so as to strengthen a gas flow motion, e.g., a tumbling flow, and, thus, promote dispersing of the air-fuel mixture and cause the air-fuel mixture to become more homogeneous. Conversely, by controlling the intake control valve 20 such that then gas flow is not strengthened, dispersing of the air-fuel mixture can be prevented and the stratified state achieved by control of the electric discharge unit 5 can be maintained.

In this way, the homogenization and stratification of the activated air-fuel mixture can be executed even more aggressively.

By controlling the gas flow motion, an effect of promoting (accelerating) the combustion by strengthening the flow motion can be obtained in a region of low engine speeds and high engine loads (i.e., a region in which the gas flow motion is strengthened).

The gas flow motion controlled by the intake control valve 20 can be a tumble flow or a swirl flow; either is acceptable. Thus, the gas flow motion control device (the intake control valve 20) can be either a swirl control valve or a tumble plate configured to adjust the gas flow motion by controlling the cross sectional area of the flow passage of the intake port.

An example of controlling the gas flow motion inside the cylinder will now be explained. If the engine load is detected as the operating condition, the gas flow motion can be controlled such that it is stronger when the engine load is in a low load region than in cases when the engine load is in a high load region. In this way, the air-fuel mixture activated by the electric discharge device 5 inside the combustion chamber can be controlled to be more homogeneous when the engine load is in a low load region than in cases when the engine load is in a high load region, thereby reducing the ignition start timing angle and increasing the combustion speed in the entire combustion chamber. As a result, the operating region can be expanded to include lower loads. Conversely, by weakening the gas flow motion when the engine load is in a high load region (i.e., by making the gas flow weaker than in cases when the engine load is in a low load region), the gas flow motion inside the combustion chamber can be controlled to be more stratified and the ignition start timing angle can be increased such that a phase difference is provided in the ignition timing, thus making the combustion more sluggish. As a result, knocking can be prevented and the operating region can be expanded to include higher loads.

If the engine speed is detected as the operating condition, the gas flow motion can be controlled such that it is weaker when the engine speed is in a low speed range than in cases when the engine speed is in a high speed range, thus achieving a stratified air-fuel mixture inside the combustion chamber when the engine speed is in a low speed range. Since the actual amount of time is longer when the engine speed is in a low speed range, a longer combustion period is readily available. Thus, by stratifying the air-fuel mixture more than in cases when the engine speed is in a high speed range, the ignition start timing angle can be increased and a phase difference can be provided in the ignition timing inside the combustion chamber, thus making the combustion more sluggish. Conversely, by strengthening the gas flow motion when the engine speed is in a high speed range in comparison with when the engine speed is in a low speed range, thus achieving a more homogeneous air-fuel mixture inside the combustion chamber. Since the actual time is shorter when the engine speed is in a high speed range, the combustion period can be shortened and the operable region can be expanded to include higher engine speeds by making the air-fuel mixture more homogeneous than in cases when the engine speed is in a low speed range.

Figure 9:
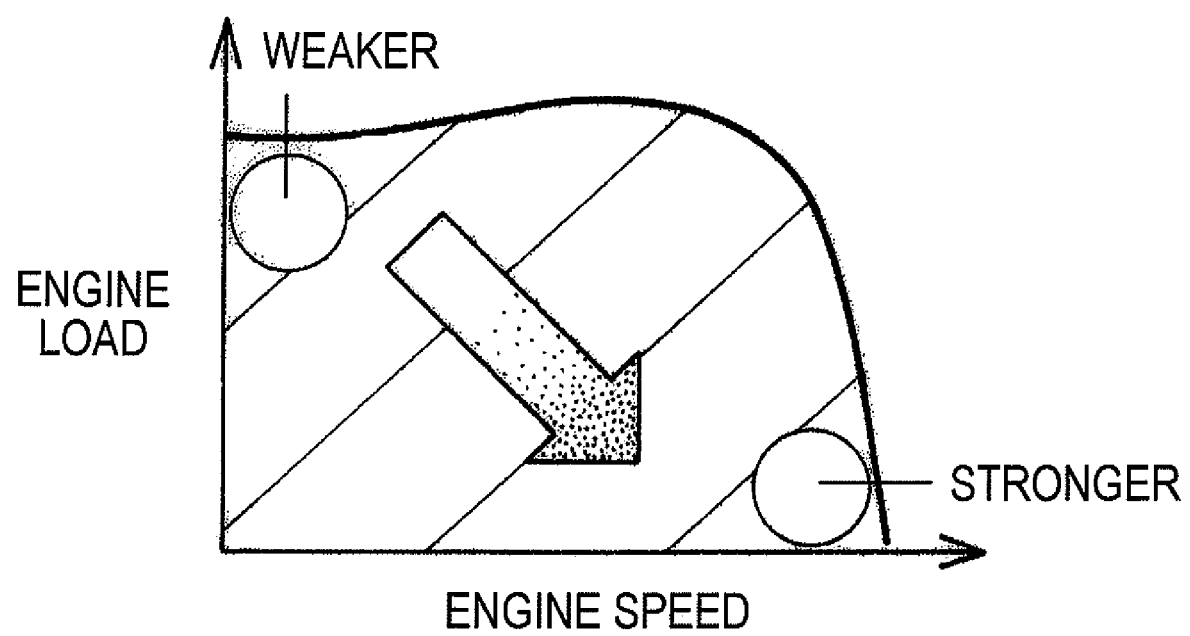
FIG. 9 is a plot illustrating the strength of the gas flow motion inside the cylinder in relation to the engine load and the engine speed.

It is also acceptable to combine the two controls just described. More specifically, both the engine load and the engine speed can be detected and the control can be configured such that, as shown in FIG. 9, the gas flow motion is weaker when the engine load is in a high load region and the engine speed is in a low speed range and stronger when the engine load is in a low load region and the engine speed is in a high speed range. In this way, an ignition start timing angle can be established at a timing tailored to the operating conditions and the combustion can be controlled such that the operable region is expanded with respect to both the engine speed and the engine load.

Figure 10:
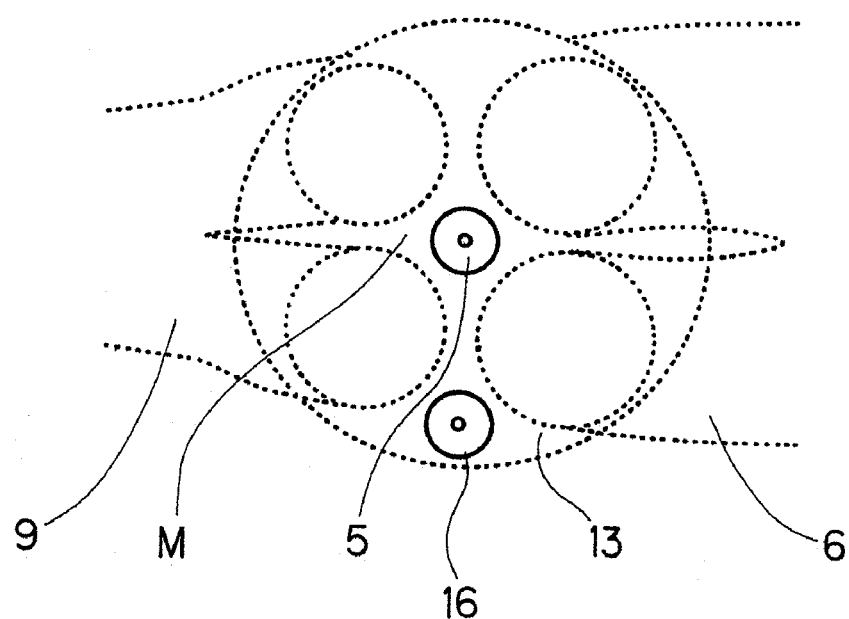
FIG. 10 is a schematic top plan view of a combustion area of an engine in accordance with a second embodiment.
Figure 11:
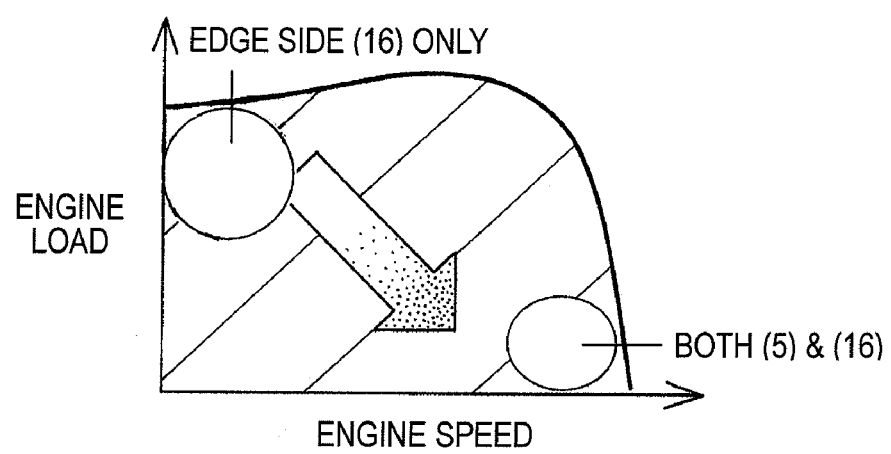
FIG. 11 is a plot illustrating manner in which the electric discharge devices are controlled.

Referring now to FIGS. 10 and 11, a second embodiment of the present invention will now be explained. In FIG. 10, the combustion chamber 13 is provided with an additional electric discharge unit 16 that is operatively connected to the controller 15 shown in FIG. 1. Thus, the internal combustion engine of this second embodiment is identical to FIG. 1, except for the additional electric discharge unit 16 and the control thereof by the controller 15.

FIG. 10 shows a layout in which the two electric discharge units 5 and 16 are provided per cylinder. FIG. 11 shows an example of how the operation of the electric discharge units 5 and 16 change depending on the operating conditions. The electric discharge unit 5 is arranged substantially in the middle of the combustion chamber 13 and the electric discharge unit 16 is arranged in the vicinity of an edge of the combustion chamber 13.

The applied voltage and voltage application time of the electric discharge units 5 and 16 are controlled in such a manner (described later) that stratification of the activated air-fuel mixture can be executed more aggressively and a larger amount of activated air-fuel mixture can be produced, thus further expanding the operating region of the engine.

The electric discharge devices 5 and 16 are controlled by, for example, detecting the engine load as an operating condition and using both electric discharge units to activate the air-fuel mixture inside the combustion chamber when the engine load is in a low load region. Meanwhile, only the electric discharge unit positioned at the edge of the combustion chamber is used to activate the air-fuel mixture inside the combustion chamber when the engine load is in a high load region.

With this control method, a large amount of activated air-fuel mixture can be produced using both of the electric discharge units 5 and 16 when the engine load is in a low load region. As a result, the combustion speed is increased and the operating region is expanded to include lower engine loads. When the engine load is in a high load region, the ignition start timing angle inside the combustion chamber 13 can be increased by activating the air-fuel mixture using only the electric discharge unit 16. Increasing the angle provides a phase difference in the ignition timing and makes the combustion more sluggish. As a result, the operating region can be expanded to include higher engine loads.

It is also acceptable to detect the engine speed as the operating condition and configure the control to activate the air-fuel mixture inside the combustion chamber 13 using only the electric discharge unit 16 arranged near and edge portion of the combustion chamber 13 when the engine speed is in a low speed range and using both electric discharge units 5 and 16 when the engine speed is in a high speed range.

Since the actual time is longer when the engine speed is in a low speed range, a longer combustion period is readily available and the air-fuel mixture inside the combustion chamber 13 can be activated sufficiently even if only the electric discharge unit 16 is used. Thus, the imparted energy can be decreased and the combustion can be slowed down because the ignition start timing angle is increased and a phase difference is provided in the ignition timing. Meanwhile, when the engine speed is in a high speed range, a larger amount of activated air-fuel mixture can be produced by using both of the electric discharge units 5 and 16. By using both electric discharge units 5 and 16, the combustion speed can be increased and the operating region can be expanded to include higher engine speeds.

Furthermore, it is also acceptable to use a combination of the two controls just described. In such a case, the engine load and engine speed are detected as operating conditions and the air-fuel mixture inside the combustion chamber 13 is activated using both of the electric discharge units 5 and 16 when the engine load is in a low load region and the engine speed is in a high speed range and using only the electric discharge unit 16 when the engine load is in a high load region and the engine speed is in a low speed range (see FIG. 11).

In this way, an ignition start timing angle can be established at a timing tailored to the operating conditions and the combustion can be controlled such that the operable region is expanded with respect to both the engine speed and the engine load.

Figure 12:
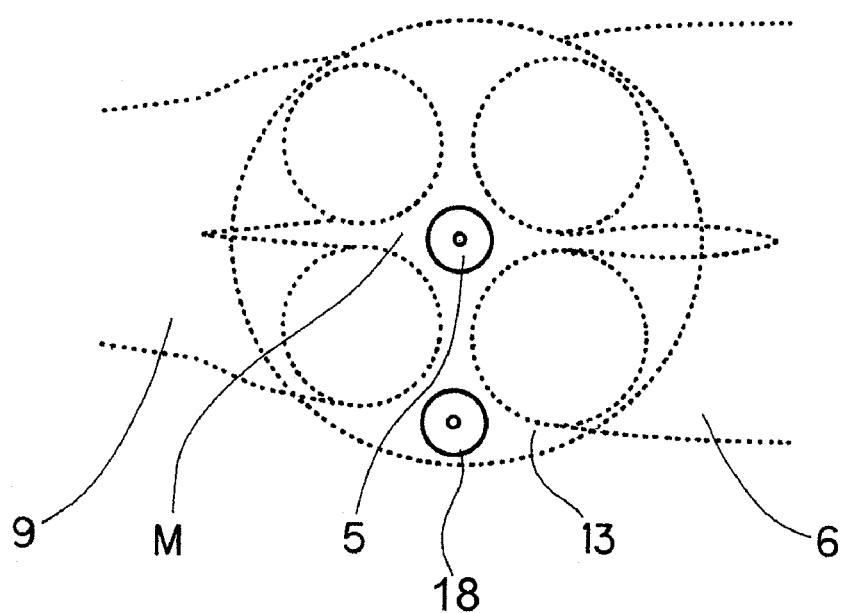
FIG. 12 is a schematic top plan view of a combustion area of an engine in accordance with a second embodiment.

Referring now to FIGS. 12 to 15, a third embodiment of the present invention will now be explained. The constituent features of the internal combustion engine to which this embodiment is applied and the control of the applied voltage and voltage application time of the controller 15 are basically the same as in the first embodiment. The difference is that, in this embodiment, when the engine departs from a region in which HCCI control is possible, the ignition mode is switched from a compression self ignition or HCCI control to a spark ignition control using a spark ignition device. In FIG. 12, the combustion chamber 13 is provided with a dedicated spark ignition device 18 that is operatively connected to the controller 15 shown in FIG. 1. Thus, the internal combustion engine of this third embodiment is identical to FIG. 1 except for the addition of the dedicated spark ignition device 18 and the control thereof by the controller 15.

Figure 13:
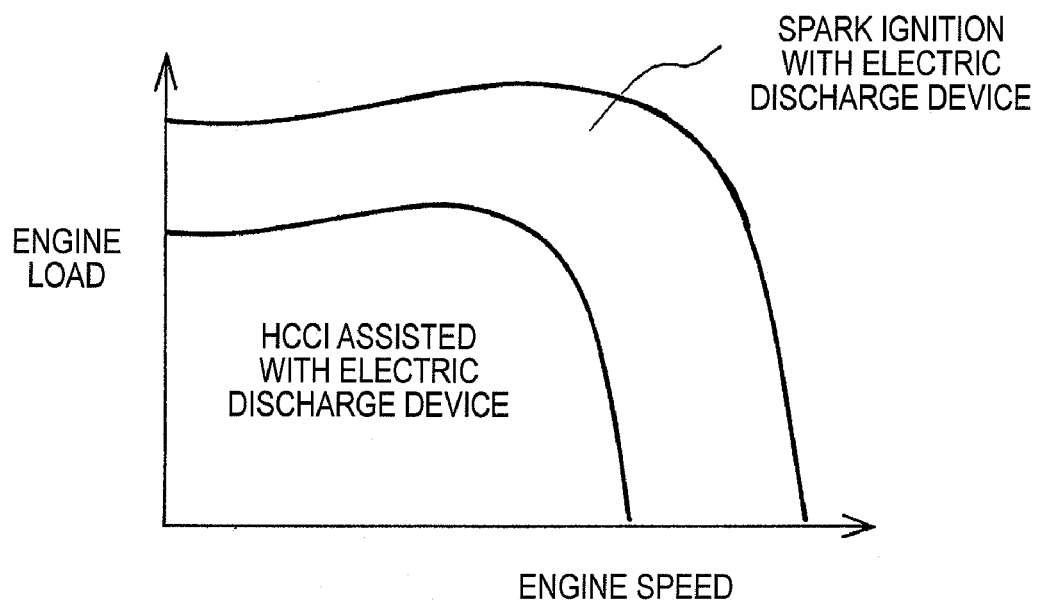
FIG. 13 is a plot illustrating an example of the manner in which the electric discharge device is switched in the third embodiment.
Figure 14:
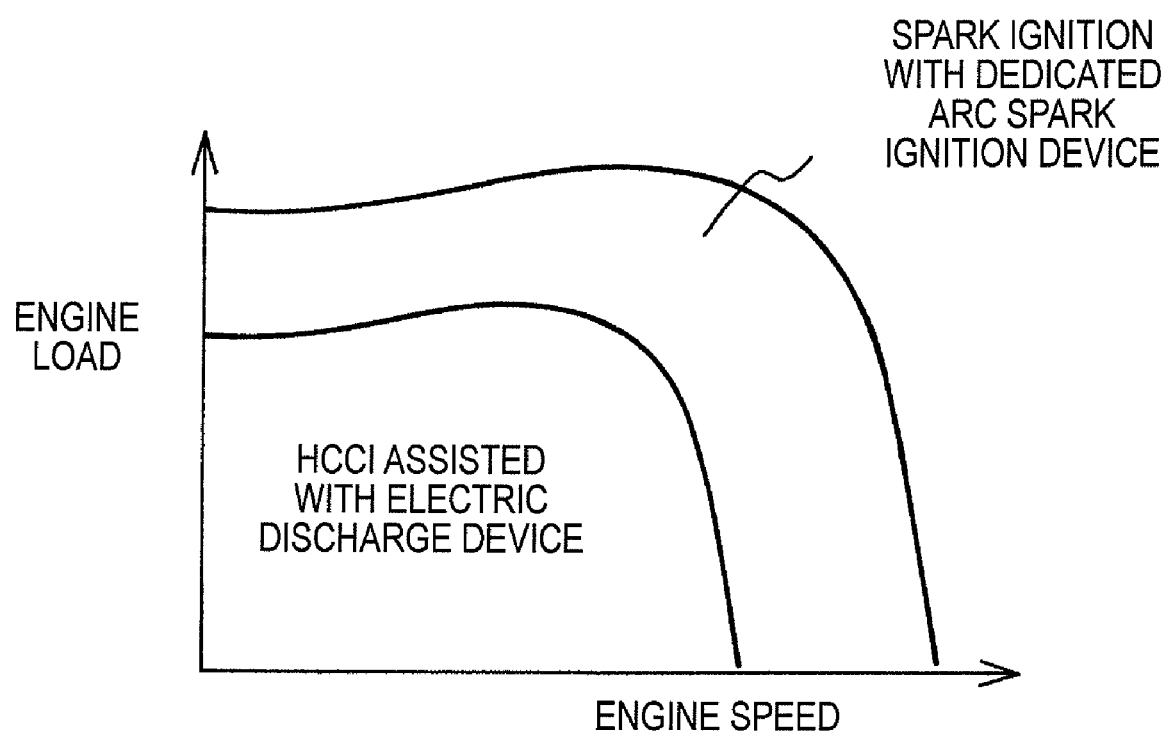
FIG. 14 is a plot illustrating an example of the manner in which the electric discharge device is switched in the third embodiment.
Figure 15:
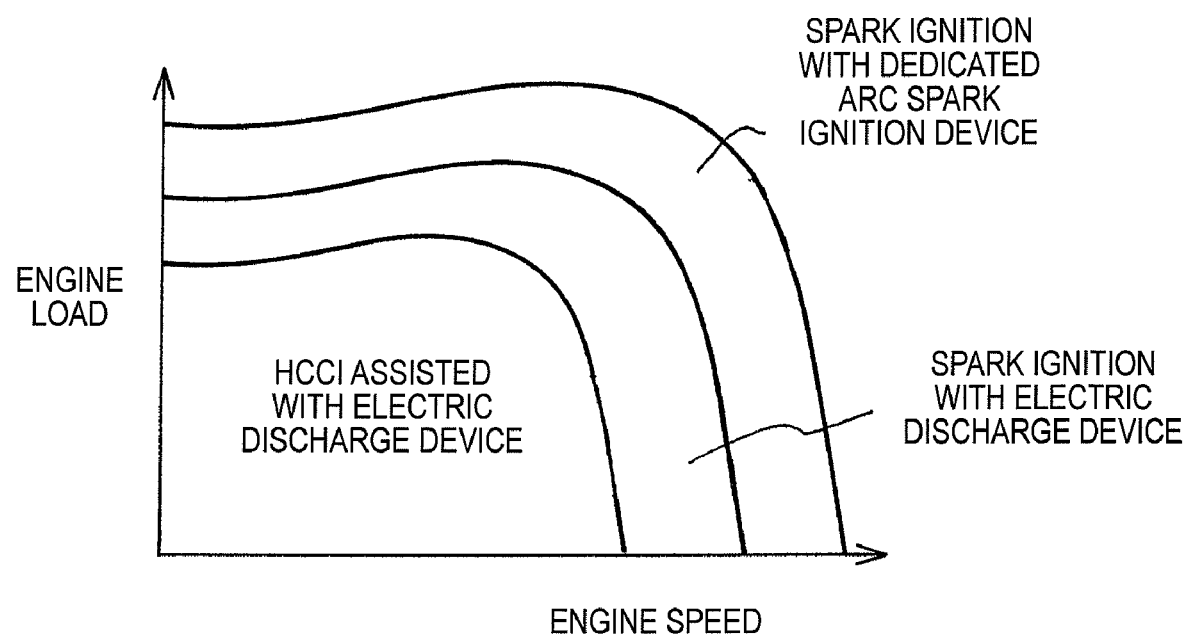
FIG. 15 is a plot illustrating an example of the manner in which the electric discharge device is switched in the third embodiment.

The switch is controlled, for example, as shown in FIG. 13. When the engine speed is higher than an engine speed upper limit value above which HCCI control is not possible or when the engine load is high loader than an engine load upper value above which HCCI control is not possible, the voltage applied to the electric discharge unit 5 is increased such that a transition to arc discharging occurs. As a result, the air-fuel mixture can be ignited in the same manner as the spark ignition achieved with a typical spark plug and the regions in which HCCI control is not possible can be covered. Since the discharge volume of the electric discharge unit 5 is large, the combustion speed is increased and the lean limit is increased. As a result, highly efficient operation can be accomplished even after switching to spark ignition control from HCCI control.

It is also acceptable to provide a spark ignition device dedicated specifically to arc discharging in addition to the electric discharge unit 5 and to accomplish the switch to spark ignition by using the dedicated spark ignition device 18.

Furthermore, it is also acceptable to use a combination of the two engine designs and controls just described. For example, when the engine enters a region in which it can not operate using HCCI, it first switches to spark ignition accomplished by producing an arc discharge with the electric discharge unit 5. Then, if the engine enters a region in which it can not operate using an arc discharge produced with the electric discharge unit, it switches to operation using the dedicated spark ignition device 18.

With the combined control, when the engine enters an operating region in which it can not be operated using HCCI, the lean limit can be increased and highly efficient operation can be accomplished by producing an arc discharge with the electric discharge unit 5. Additionally, in high engine speed and high engine load regions where the engine can not be operated at with an arc discharge from the electric discharge unit 5, the engine can be operated by switching to spark ignition using the dedicated spark ignition device (which is specifically designed for producing an arc discharge).

Additionally, by changing the compression ratio when the engine is switched from HCCI control to spark ignition control, the decline in fuel efficiency resulting from the switch can be suppressed.

For example, a variable compression ratio mechanism 40 like that presented in Japanese Laid-Open Patent Publication No. 2002-115571 (corresponds to U.S. Pat. No. 6,491,003) can be used to adjust the compression ratio. More specifically, the variable compression ratio mechanism presented in said publication comprises a plurality of linkages connecting the piston to the crankshaft. By changing the geometry of the linkages using an actuator, the top dead center position of the piston can be changed. When the engine switches from HCCI control to spark ignition control, the variable compression ratio 40 reduces the compression ratio by lowering the top dead center position of the piston.

When, for example, a variable valve timing mechanism is used to change the actual compression ratio, the intake timing becomes restricted in order to achieve the target compression ratio. By using a variable compression ratio mechanism 40 like that just described, the ignition mode can be switched without incurring a restriction of the intake timing and the decline in fuel efficiency resulting from the switch can be suppressed.

It is also possible to use a variable valve timing mechanism 41 as the way of changing the compression ratio. In such a case, when the engine is switched from HCCI control to spark ignition control, the effective compression ratio is reduced by advancing the close timing of the intake valve.

When the actual compression ratio is reduced using a variable valve timing mechanism, the S/V ratio of the combustion chamber is not degraded because the top dead center position of the piston does not change. As a result, an increase in cooling loss resulting from switching the ignition mode can be prevented.

The variable compression ratio mechanism 40 does not have to be configured as described previously. For example, it is also feasible to use a mechanism configured to adjust the height of the piston crown using hydraulic device provided inside the piston itself, a mechanism configured to adjust the distance between the head and the block, or a mechanism configured to adjust the piston height by offsetting the center of the crankshaft.

Likewise, the variable valve timing mechanism 41 can be a mechanism configured to twist cams, such as a variable valve timing system that employs vanes, cams, and linkages (e.g., Japanese Laid-Open Patent Publication No. 9-60508, which corresponds to U.S. Pat. No. 5,823,152), or a mechanism configured to switch between two different cams providing two different valve timings, such as a direct variable valve timing system.

The present invention is not limited to the embodiments described heretofore. Various changes and modifications can be made without departing from the technical ideas presented in the claims.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An internal combustion engine comprising:
a combustion chamber in which a mixture of fuel and air is caused to undergo compression self ignition;
an electric discharge unit provided inside the combustion chamber to generate an electric discharge for conducting combustion inside the combustion chamber; and
a controller device configured to control a voltage applied to the electric discharge unit, the controller being configured to control the electric discharge unit such that a non-thermal plasma can be formed without incurring a transition to arc discharging, and to control the quantity and distribution of an activated air-fuel mixture inside the combustion chamber in accordance with an operating condition of the internal combustion engine.

2. The internal combustion engine as recited in claim 1, wherein
the controller is configured to control the quantity and distribution of the activated air-fuel mixture inside the combustion chamber by controlling an applied voltage of the voltage applied to the electric discharge unit and an voltage application time that the voltage is applied.

3. The internal combustion engine as recited in claim 2, wherein
the controller is configured to control the applied voltage and the voltage application time such that an amount of energy imparted to the electric discharge unit is substantially constant regardless of the operating condition.

4. The internal combustion engine as recited in claim 3, wherein
the controller is configured to set the voltage application time and the applied voltage based on detection of an engine load as the operating condition such that the voltage application time is set longer and the applied voltage is set smaller when the engine load is detected as being in a low load region.

5. The internal combustion engine as recited in claim 3, wherein
the controller is configured to set the voltage application time and the applied voltage based on detection of an engine rotational speed as the operating condition such that the voltage application time is set longer and the applied voltage is set smaller when the engine rotational speed is detected as being in a low speed range, and such that the voltage application time is set shorter and the applied voltage is set larger when the engine rotational speed is detected as being in a high speed range.

6. The internal combustion engine as recited in claim 3, wherein
the controller is configured to set the voltage application time and the applied voltage based on detection of an engine load and an engine rotational speed as the operating condition such that the voltage application time is set longer and the applied voltage is set smaller when the engine load is detected as being in a low load region and the engine rotational speed is detected as being in a low speed range, and such that the voltage application time is set shorter and the applied voltage is set larger when the engine load is detected as being in a high load region and the engine rotational speed is detected as being in a high speed range.

7. The internal combustion engine as recited in claim 2, wherein
the controller is configured to change an amount of energy imparted to the electric discharge unit in accordance with the operating condition.

8. The internal combustion engine as recited in claim 7, wherein
the controller is configured to set the amount of energy imparted to the electric discharge unit based on detection of an engine load as the operating condition such that the amount of energy imparted to the electric discharge unit is set to a larger value when the engine load is detected as being in a low load region.

9. The internal combustion engine as recited in claim 7, wherein
the controller is configured to set the amount of energy imparted to the electric discharge unit based on detection of an rotational speed as the operating condition such that the amount of energy imparted to the electric discharge unit is set to a smaller value when the engine rotational speed is detected as being in a low speed range.

10. The internal combustion engine as recited in claim 7, wherein
the controller is configured to set the amount of energy imparted to the electric discharge unit based on detection of an engine load and an engine rotational speed as the operating condition such that the amount of energy imparted to the electric discharge unit is set to a larger value when the engine load is detected as being in a low load region and the engine rotational speed is detected as being in a high speed range, and such that the amount of energy imparted to the electric discharge unit is set to a smaller value when the engine load is detected as being in a high load region and the engine rotational speed is detected as being in a low speed range.

11. The internal combustion engine as recited in claim 8, wherein
the controller is configured to set the voltage application time based on detection of the engine load as the operating condition such that the voltage application time is set longer when the engine load is detected as being in the low load region.

12. The internal combustion engine as recited in claim 8, wherein
the controller is configured to set the applied voltage based on detection of the engine load as the operating condition such that the applied voltage is set larger when the engine load is detected as being in the low load region.

13. The internal combustion engine as recited in claim 9, wherein
the controller is configured to set the voltage application time based on detection of the engine rotational speed as the operating condition such that the voltage application time is set longer when the engine rotational speed is detected as being in the low speed range.

14. The internal combustion engine as recited in claim 9, wherein
the controller is configured to set the applied voltage based on detection of the engine rotational speed as the operating condition such that the applied voltage is set smaller when the engine rotational speed is detected as being in the low speed range.

15. The internal combustion engine as recited in claim 10, wherein
the controller is configured to set the voltage application time based on detection of the engine load and the engine rotational speed as the operating condition such that the voltage application time is set to a longer value when the engine load is detected as being in a low load region and the engine rotational speed is detected as being in a low speed range, and such that the voltage application time is set shorter and the applied voltage is set larger when the engine load is detected as being in a high load region and the engine rotational speed is detected as being in a high speed range.

16. The internal combustion engine as recited in claim 10, wherein
the controller is configured to set the applied voltage based on detection of the engine load and the engine rotational speed as the operating condition such that the applied voltage is set to larger when the engine load is detected as being in the low load region and the engine rotational speed is detected as being in the high speed range, and such that the applied voltage is set smaller when the engine load is detected as being in the high load region and the engine rotational speed is detected as being in a low speed range.

17. The internal combustion engine as recited in claim 1, further comprising
a control device arranged to control the distribution of the air-fuel mixture inside the combustion chamber, which has been activated by the electric discharge unit, based on a gas flow motion inside a cylinder such that the air-fuel mixture selectively becomes homogeneous or stratified.

18. The internal combustion engine as recited in claim 17, further comprising
a combustion state selecting device configured to change the fuel-air mixture in the combustion chamber between a homogeneous state and a stratified state, and
the controller being configured to control the electric discharge unit and the combustion state selecting device such that the air-fuel mixture inside the combustion chamber, which is activated by the electric discharge unit, is more homogeneous when an engine load is detected as being in a low load region than in cases when the engine load is detected as being in a high load region and more stratified when the engine load is detected as being in the high load region than in cases when the engine load is detected as being in the low load region.

19. The internal combustion engine as recited in claim 17, further comprising
a combustion state selecting device configured to change the fuel-air mixture in the combustion chamber between a homogeneous state and a stratified state, and
the controller being configured to control the electric discharge unit and the combustion state selecting device such that the air-fuel mixture inside the combustion chamber, which is activated by the electric discharge unit, is more stratified when the engine rotational speed is detected as being in a low speed range than in cases when the engine rotational speed is detected as being in a high low speed range and more homogeneous when the engine rotational speed is detected the high speed range than in cases when the engine rotational speed is detected as being in the low speed range.

20. The internal combustion engine as recited in claim 17, further comprising
a combustion state selecting device configured to change the fuel-air mixture in the combustion chamber between a homogeneous state and a stratified state, and
the controller being configured to control the electric discharge unit and the combustion state selecting device such that the air-fuel mixture inside the combustion chamber, which is activated by the electric discharge unit, is more homogeneous when the engine load is detected as being in a low load region and the engine rotational speed is detected as being in a high speed range than in cases when the engine load is detected as being in a high load region and the engine rotational speed is detected as being in a low speed range and more stratified when the engine load is detected as being in the high load region and the engine rotational speed is detected as being in the low speed range than in cases when the engine load is detected as being in the low load region and the engine rotational speed is detected as being in the high speed range.

21. The internal combustion engine as recited in claim 1, further comprising
an additional electric discharge unit positioned comparatively near an end portion of the combustion chamber, and
the controller being configured to control an applied voltage of the voltage applied to each of the electric discharge units and an voltage application time that the voltage is applied in accordance with the operating condition.

22. The internal combustion engine as recited in claim 21, wherein
the controller is configured to activate the air-fuel mixture inside the combustion chamber based on detection of an engine load as the operating condition such that both the electric discharge units are used to activate the air-fuel mixture inside the combustion chamber when the engine load is detected as being in a low load region, and such that only the additional electric discharge unit positioned at the end portion of the combustion chamber is used to activate the air-fuel mixture inside the combustion chamber when the engine load is detected as being in a high load region.

23. The internal combustion engine as recited in claim 21, wherein
the controller being configured to activate the air-fuel mixture inside the combustion chamber based on detection of an engine rotational speed as the operating condition such that only the additional electric discharge unit positioned at the end portion of the combustion chamber is used to activate the air-fuel mixture inside the combustion chamber when the engine rotational speed is detected as being in a low speed range, and such that both the electric discharge units are used to activate the air-fuel mixture inside the combustion chamber when the engine rotational speed is detected as being in a high speed range.

24. The internal combustion engine as recited in claim 21, wherein
the controller being configured to activate the air-fuel mixture inside the combustion chamber based on detection of an engine load and an engine rotational speed as the operating condition such that both the electric discharge units are used to activate the air-fuel mixture inside the combustion chamber when an engine load is detected as being in a low load region and an engine rotational speed is detected as being in a high speed range and such that only the additional electric discharge unit positioned at the end portion of the combustion chamber is used to activate the air-fuel mixture inside the combustion chamber when the engine load is detected as being in a high load region and the engine rotational speed is detected as being in a low speed range.

25. The internal combustion engine as recited in claim 1, wherein
the controller is configured to selectively switch, based on the operating condition, between a compression self ignition control executed using an electric discharge from the electric discharge unit and a spark ignition control executed using an arc discharge device.

26. The internal combustion engine as recited in claim 1, wherein
the controller is configured to selectively switch, based on the operating condition, between a compression self ignition control executed using an electric discharge from the electric discharge unit and a spark ignition control executed using an electric discharge from the electric discharge unit alone.

27. The internal combustion engine as recited in claim 1, wherein
the controller is configured to selectively switch, based on the operating condition, between a compression self ignition control executed using an electric discharge from the electric discharge unit, a spark ignition control executed using an electric discharge from the electric discharge unit alone, and a spark ignition control executed using an arc discharge device.

28. The internal combustion engine as recited in claim 25, further comprising
a variable compression ratio mechanism configured to variably control a cylinder volume at top dead center,
the controller being configured to control the variable compression ratio mechanism to reduce a compression ratio when the engine is switched from a compression self ignition control in which the air-fuel mixture inside the cylinder is ignited by compression self ignition to an spark ignition control in which the air-fuel mixture inside the cylinder is ignited with an arc discharge.

29. The internal combustion engine as recited in claim 25, further comprising a variable valve timing mechanism configured to variably control an operating time of at least one of an intake valve and an exhaust valve, the controller being configured to control the variable valve timing mechanism to reduce an effective compression ratio when the engine is switched from a compression self ignition control in which the air-fuel mixture inside the cylinder is ignited by compression self ignition to an spark ignition control in which the air-fuel mixture inside the cylinder is ignited with an arc discharge.

30. An internal combustion engine comprising:

means for forming a combustion chamber in which a mixture of fuel and air is caused to undergo compression self ignition;

electric discharge means for generating an electric discharge to conduct combustion inside the combustion chamber; and means for controlling a voltage applied to the electric discharge means to control the electric discharge means such that a non-thermal plasma can be formed without incurring a transition to arc discharging, and to control the quantity and distribution of an activated air-fuel mixture inside the combustion chamber in accordance with an operating condition of the internal combustion engine.

31. A combustion control method for performing compression self ignition comprising forming an air-fuel mixture in a cylinder of an internal combustion engine;

compressing the air-fuel mixture in the cylinder of the internal combustion engine to undergo compression self ignition;

forming a non-thermal plasma without incurring a transition to arc discharging using an electric discharge unit provided inside a combustion chamber of the engine; and controlling a quantity and a distribution of the air-fuel mixture inside the combustion chamber, which is activated by the electric discharge unit, in accordance with an operating condition of the internal combustion engine.

* * * * *